United States Patent [19]

Ajiki et al.

[11] E Patent Number: Re. 33,310

[45] Reissued Date of Patent: Aug. 28, 1990

[54] VALVE OPERATING AND INTERRUPTING MECHANISM FOR INTERNAL COMBUSTION ENGINE

[75] Inventors: Yoshio Ajiki, Saitama; Shigemasa Kajiwara, Tokyo, both of Japan

[73] Assignee: Honda Giken Kogyo Kabushiki Kaisha, Tokyo, Japan

[21] Appl. No.: 248,995

[22] Filed: Sep. 23, 1988

Related U.S. Patent Documents

Reissue of:

[64] Patent No.: 4,612,884
Issued: Sep. 23, 1986
Appl. No.: 758,154
Filed: Jul. 23, 1985

[30] Foreign Application Priority Data

Jul. 24, 1984 [JP] Japan ..... 59-153806

[51] Int. Cl.[5] ..... F01L 1/34; F01L 1/26

[52] U.S. Cl. ..... 123/90.16; 123/90.4; 123/90.44

[58] Field of Search ..... 123/90.12, 90.15, 90.16, 123/90.22, 90.23, 90.27, 90.32, 90.4, 90.41, 90.44

[56] References Cited

U.S. PATENT DOCUMENTS

| | | | |
|---|---|---|---|
| 1,415,167 | 5/1922 | Fuchs | 123/90.4 |
| 3,428,032 | 2/1969 | Rudert | 123/90.4 |
| 4,182,289 | 1/1980 | Nakajima et al. | 123/90.15 |
| 4,203,397 | 5/1980 | Soeters, Jr. | 123/90.16 |
| 4,252,093 | 2/1981 | Hazelrigg | 123/90.16 |
| 4,380,219 | 4/1983 | Walsh | 123/90.16 |
| 4,429,053 | 2/1984 | Chaffiotte et al. | 123/90.16 |
| 4,438,736 | 3/1984 | Hara et al. | 123/90.16 |
| 4,495,902 | 1/1985 | Burandt | 123/90.16 |
| 4,523,550 | 6/1985 | Matsuura | 123/90.16 |
| 4,534,323 | 8/1985 | Kato et al. | 123/90.44 |
| 4,537,164 | 8/1985 | Ajiki et al. | 123/90.16 |
| 4,537,165 | 8/1985 | Honda et al. | 123/90.16 |
| 4,545,342 | 10/1985 | Nakano et al. | 123/90.16 |
| 4,556,025 | 12/1985 | Morita | 123/90.16 |

FOREIGN PATENT DOCUMENTS

| | | | |
|---|---|---|---|
| 0025008 | 2/1984 | Japan | 123/90.16 |
| 0025010 | 2/1984 | Japan | 123/90.16 |
| 0025012 | 2/1984 | Japan | 123/90.44 |

*Primary Examiner*—Charles J. Myhre
*Assistant Examiner*—Weilun Lo
*Attorney, Agent, or Firm*—Lyon & Lyon

[57] ABSTRACT

An internal combustion engine valve operating mechanism wherein there is a low speed cam corresponding to one intake valve or exhaust valve and having a shape designed for low speed operation as well as a high speed cam of a shape designed for high speed operation. A first rocker arm is in sliding contact with the low speed cam and abuts one intake valve or exhaust valve, a second rocker arm is in sliding contact with the high speed cam and a third rocker arm abuts the other intake valve or exhaust valve, with all three rocker arms pivotably supported by a single rocker shaft adjacent to each other. A first piston for connecting the first and second rocker arms is slidably mounted in the first rocker arm and a second piston for connecting the second and third rocker arms is slidably mounted in the second rocker arm extendable and contractable. A third piston is movably mounted in the third rocker arm and urged by a spring in a direction of abutment with the second piston. An annular engaging groove is formed in the outer surface of the first piston, and the first rocker arm is provided with a connecting and disconnection start controlling mechanisms for being engaged with or disengaged from the groove only when the first rocker arm pivots in a valve opening direction. Consequently, the rocker arm connecting and disconnecting operations are performed at the beginning of a valve closing section ensuring the proper completion of the operation.

34 Claims, 5 Drawing Sheets

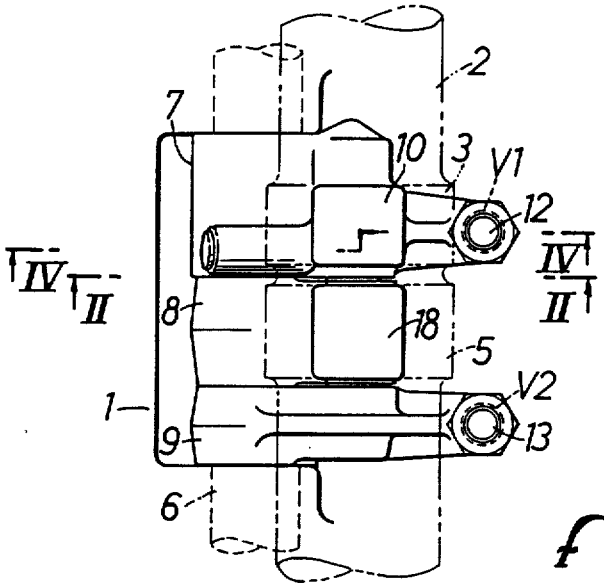
FIG. 1.
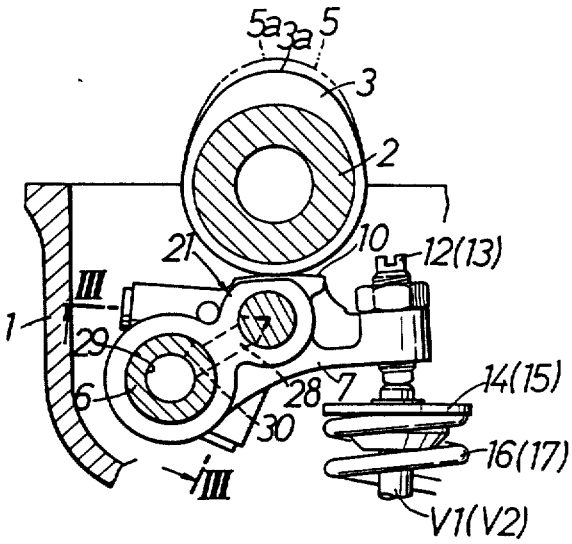
FIG. 2.
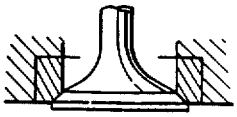

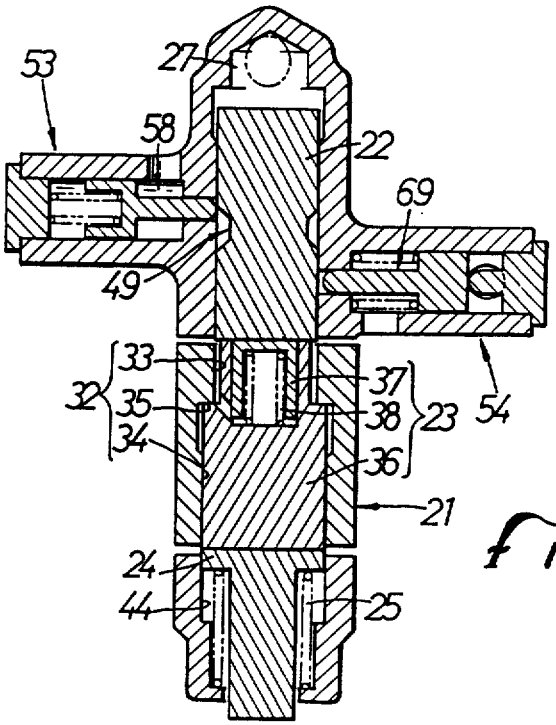
FIG. 3e.
FIG. 5.
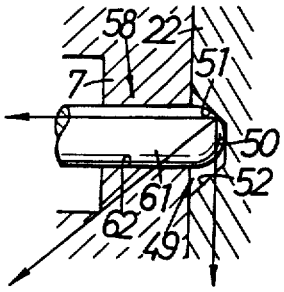
FIG. 6.
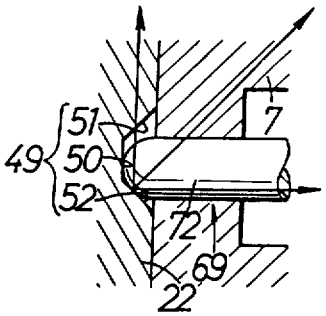

VALVE OPERATING AND INTERRUPTING MECHANISM FOR INTERNAL COMBUSTION ENGINE

Matter enclosed in heavy brackets [ ] appears in the original patent but forms no part of this reissue specification; matter printed in italics indicates the additions made by reissue.

The present invention relates to a valve operating mechanism in an internal combustion engine and, in particular, a mechanism for selectively operating one or both valves of a pair of intake or a pair of exhaust valves for each cylinder in response to the operating condition of the engine.

There have been proposals for internal combustion engines in which four valves are provided for each cylinder and it is possible to open only one intake valve or exhaust valve in low speed driving conditions and to open both intake valves or exhaust valves in the high speed driving condition whereby it is possible to improve engine output, reduce fuel consumption and improve engine idling characteristics. In one previous proposal by the present applicant, a valve operating mechanism has a connecting means in which a rocker arm corresponding to one intake valve or exhaust valve is in sliding contact with a low speed cam, during which time the cam is not in sliding contact with the rocker arm corresponding to the other intake valve or exhaust valve, and then for high speed operation the rocker arms are held in sliding contact with a high speed cam and are connected and disconnected from each other through a piston. However, in changing the state of connection by such connecting means, it is necessary that the rocker arms be in an unpivoting state, namely, in a state of sliding contact with the base circles of the low and high speed cams. For example, assuming there is to be a change from a state in which only one intake valve or exhaust valve is open or closed to a state in which both intake valves or exhaust valves are open or closed, normally the movement of the piston is started for connecting the rocker arms by the connecting means at a time point t1 in the "valve closed" section Ac of one intake valve or exhaust valve as shown in FIG. 7, namely, in a section in which the rocker arms are stationary and in sliding contact with the cam base circles. The valve opening section Ao of the intake valve or exhaust valve, namely, the rocker arm pivoting section, starts immediately after the closed section Ac, so it becomes difficult for the connecting piston to move into connecting position and even if the rocker arms are connected slightly through the piston, they may become partially disconnected thus making a positive change-over impossible.

It is an object of the present invention to provide a valve operating mechanism for an internal combustion engine of a simple structure in which only one intake valve or exhaust valve is actuated during a low speed operation of an engine, while both intake valves or exhaust valves are actuated during a high speed operation of the engine, wherein the change-over between high and low speed operations is accomplished effectively and at the correct time in the cycle. A further object of this invention is to provide such a valve operating mechanism wherein the high and low speed operations employ two different cams for selectively operating the valve.

Further and more detailed objects and advantages of the invention will appear to those skilled in the art from the following description of a preferred embodiment and the accompanying drawings, wherein:

FIG. 1 is a plan view of the valve operating mechanism of this invention showing the rocker arms for two valves, either exhaust or intake, of a single cylinder of an internal combustion engine, with the camshaft and rocker arm shown in phantom lines.

FIG. 2 is a sectional elevation view of the valve operating mechanism of this invention, taken substantially on the line II—II in FIG. 1.

FIGS. 3a through 3e are enlarged sectional views taken substantially on the line III—III in FIG. 2 illustrating the connecting means of the valve mechanism in various operating positions.

FIG. 5 is an enlarged sectional view similar to FIG. 3 of a portion of the connecting means of the valve mechanism of this invention illustrating the stopper pin in a connection starting condition.

FIG. 6 is a view similar to FIG. 5 but illustrating the stopper pin in a disconnection starting condition.

Figure 3A:
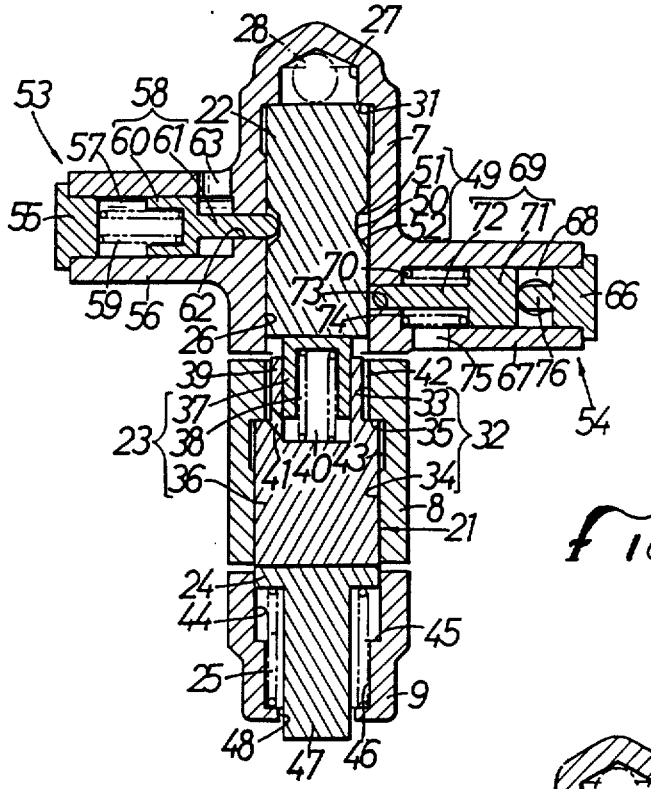

Referring now to the preferred embodiment of the present invention as illustrated in the drawings. FIGS. 1 and 2 shows an engine body 1 with a cylinder having a pair of intake valves V1 and V2 that are selectively opened and closed by the operation of a low speed cam 3 and a high speed cam 5 both integral with a cam shaft 2 which is driven at a ½ speed ratio in synchronism with the rotation of the crankshaft of the engine. The valves are actuated by the first, second and third rocker arms 7, 8 and 9 which are pivotably supported on a rocker shaft 6 mounted parallel to the cam shaft 2. That cylinder of the engine body is further provided with a pair of exhaust valves (not shown), which are opened and closed in the same way as in the intake valves V1 and V2. A conventional automobile engine will have multiple cylinders operating in the same manner but only one pair of intake valves and their operation will be described here.

The cam shaft 2 is disposed rotatably above the engine body, and the low speed cam 3 is integral with the cam shaft 2 in a position corresponding to one intake valve V1. The high speed cam 5 is integral with the cam shaft 2 in a position between the two intake valves V1 and V2. The low speed cam 3 has a shape preferred for low speed operation of the engine with a raised portion or cam lobe 3a of a relatively small outward projection extending radially of the cam shaft 2. The high speed cam 5 has a shape preferred for a high speed operation of the engine with a raised portion or lobe 5a projecting radially outwards of the cam shaft 2 to a larger extent than the raised portion 3a of the low speed cam 3 and extending over a wider central angle range than the raised portion 3a.

The rocker shaft 6 is fixed below and to one side of the cam shaft 2. On the rocker shaft 6 are pivotably mounted the first, second and third rocker arms 7, 8 and 9, respectively, of which the first and third rocker arms 7 and 9 are formed basically in the same shape. More specifically, the first and third rocker arms 7 and 9 are supported rockably at their base portions by the rocker shaft 6 in positions corresponding to the intake valves V1 and V2 and extend to positions above the intake valves V1 and V2. The first rocker arm 7 is provided at an upper portion thereof with a cam slipper 10 which is in sliding contact with the low speed cam 3. The third rocker arm 9 has no such cam slipper. Tappet screws 12 and 13 capable of abutting the upper ends of the intake valves V1 and V2 are threadedly engaged with the extending end portions of the first and third rocker arms 7 and 9 positioned above the intake valves V1 and V2 for adjustment.

The intake valves V1 and V2 are provided at the upper ends thereof with flange portions 14 and 15. Valve springs 16 and 17 surround the intake valves V1 and V2 and are disposed between the flange portions 14, 15 and the engine body 1, whereby the intake valves V1 and V2 are urged in the valve closing direction, namely, upward.

The second rocker arm 8 is pivotably supported by the rocker shaft 6 between the first and third rocker arms 7 and 9. The second rocker arm 8 is extended slightly from the rocker shaft 6 toward the intake valves V1 and V2 and it is provided at an upper portion thereof with a cam slipper 18 which is in sliding contact with the high speed cam 5. Further, the second rocker arm 8 is urged pivotally upward by means of a spring (not shown) and is thereby resiliently held in sliding contact with the high speed cam 5 at all times.

The first, second and third rocker arms 7, 8 and 9 are in sliding contact with each other and a connecting means, generally designated 21, is provided for switching between a state which permits relative angular displacements of those rocker arms and a state in which the rocker arms 7 to 9 are connected integrally.

Referring now to FIG. 3a, the connecting means 21 includes a first piston 22 capable of connecting between the first and second rocker arms 7 and 8; a second piston 23 which can connect between the second and third rocker arms 8 and 9 and which is in abutment with the first piston 22; a third piston 24 which is in abutment with the second piston 23; and a spring 25 which urges the third piston 24 toward the second piston 23 for continually urging the first and second pistons 22 and 23 toward a disconnecting position.

In the rocker arm 7 is formed a guide bore 26 which is open toward the second rocker arm 8 and which is parallel to the rocker shaft 6. The first piston 22 is slidably fitted in the guide bore 26, whereby an oil pressure chamber 27 is defined between one end of the first piston 22 and the bottom of the guide bore 26. In the first rocker arm 7 is formed an oil passage 28 which communicates with the oil pressure chamber 27, while in the rocker shaft 6 is formed an oil passage 29 which communicates with an oil pressure supply source (not shown). Further, a communication hole 30 which communicates with the interior of the oil passage 29 is formed in the side wall of the rocker shaft 6, see FIG. 2. The position and shape of the communication hole 30 are designed so as to be in communication continually with the oil passage 28 regardless of a pivoting state of the first rocker arm 7.

The guide bore 26 is provided in the vicinity of its bottom with a stepped portion 31 which can abut one end of the first piston 22. The length of the first piston 22 is set so that when its one end is in abutment with the stepped portion 31, the other end thereof is positioned slightly inwards from the open end of the guide bore 26, as shown in FIG. 3a.

In the second rocker arm 8 is formed a guide bore 32 corresponding to the guide bore 26. The guide bore 32, extending between both side faces, comprises successively, from the end adjacent the first rocker arm 7, a small-diameter portion 33 having an inside diameter corresponding to the guide bore 26 and a large-diameter portion 34, with the small- and large-diameter portions 33 and 34 being contiguous to each other concentrically through a stepped portion 35. Annular groove 43 is formed in portion 34 adjacent the stepped portion 35 for a purpose that will be described below. The second piston 23 is slidably fitted in the guide bore 32 and it is constructed to extend or contract with a spring force continually urging it in an expanding direction.

More specifically, the second piston 23 comprises a connecting member 36 which is slide-fitted in the large-diameter portion 34, an extending member 37 which is slide-fitted in the connecting member 36, and a spring 38 disposed between the connecting member 36 and the extending member 37, the spring 38 having a spring constant smaller than that of the spring 25. The connecting member 36, formed in the shape of a short cylinder, is provided at one end thereof with an integrally projecting cylindrical portion 39 which has an outside diameter smaller than the small-diameter portion 33 of guide bore 32. The extending member 37, formed in the shape of a bottomed cylinder, is slide-fitted into the cylindrical portion 39 with its open end facing the connecting member 36. As a result, a spring chamber 40 is defined by the connecting member 36 and the extending member 37, and the spring 38 is disposed within the spring chamber 40. The connecting member 36 and the extending member 37 are urged in directions away from each other by means of the spring 38, so that one end of the second piston 23, that is, the extending member 37, is continually resiliently urged into abutment with the first piston 22.

Figure 3B:
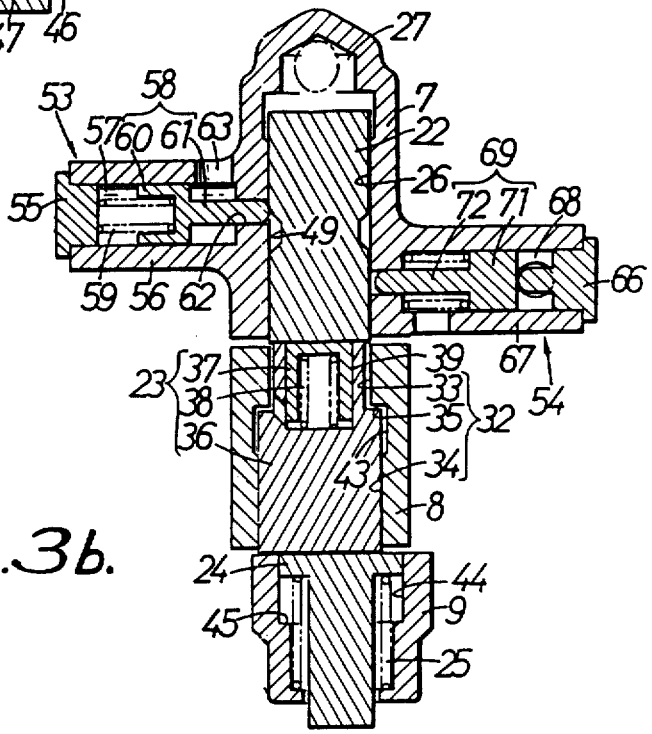

The length of the connecting member 36 is designed so that when one end thereof is in abutment with the stepped portion 35, the other end thereof is positioned between the opposed side faces of the second and third rocker arms 8 and 9 as shown in FIG. 3a. The length of the cylindrical portion 39 is designed so that when the connecting member 36 is in abutment with the stepped portion 35, the open end of the cylindrical portion does not enter the guide bore 26 of the first rocker arm 22. Further, the length of the extending member 37 is designed so that it does not abut the connecting member 36 when its closed end is flush with the open end of the cylindrical portion 39, as shown in FIG. 3b.

In a side part of the cylindrical portion 39 is formed a hole 41 which is normally in communication with the interior of the spring chamber 40. When the connecting member 36 is in abutment with the stepped portion 35 as shown in FIG. 3a, the hole 41 communicates with the exterior through an annular chamber 42 which is defined by the inner surface of the small-diameter portion 33 in the guide hole 32 and the outer surface of the cylindrical portion 39. Further, an annular groove 43 is formed in the inner surface of the large-diameter portion 34 of the guide bore 32 in a position close to the stepped portion 35. When the first piston 22 is slide-fitted in the small-diameter portion 33 of the guide bore 32, the hole 41 comes into communication with the annular groove 43. With such a construction, the interior of the spring chamber 40 is prevented from being pressurized or creating a vacuum with sliding motions of the extending member 37 in the cylindrical portion 39, and consequently the movement of the extending member 37 is unrestricted.

In the third rocker arm 9 is formed a guide bore 44 corresponding to the guide bore 32 and being open toward the second rocker arm 8. The guide bore 44 has the same diameter as the large-diameter portion 34 of the guide bore 32 and it is formed with a small-diameter portion 46 through a stepped portion 45 in a position close to its bottom. The third piston 24, formed in the shape of "T" or a rod with a disc on top, is slide-fitted in the guide bore 44 so that it can slide into abutment with the stepped portion 45, as shown in FIG. 3d. The third piston 47 is integrally provided with a guide rod 47 which extends through a hole 48 formed in the bottom of the guide bore 44. Further, the spring 25 is disposed around the guide rod 47 between the disc of the third piston 24 and the bottom of the guide bore 44 and the third piston 24 is continually urged into abutment with the connecting member 36 of the second piston 23 by the biasing force of the spring 25.

Figure 4:
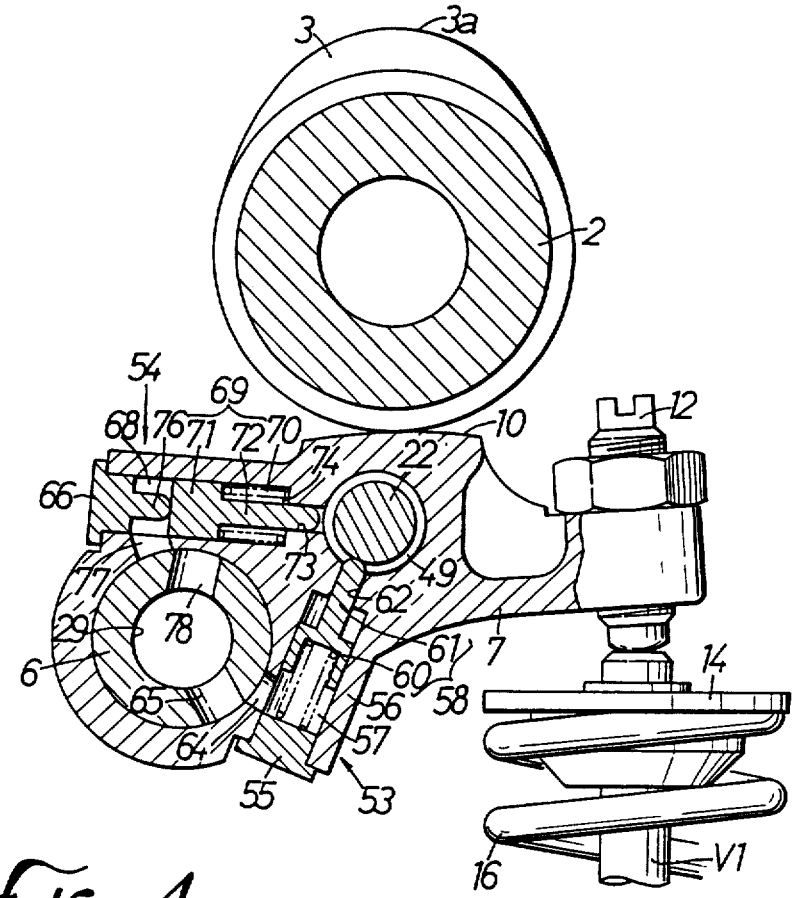
FIG. 4 is an enlarged sectional elevation view taken substantially on the line IV—IV in FIG. 1.

Referring now to FIGS. 4, 5 and 6, an annular engaging groove 49 is formed in the outer surface of the first piston 22. The engaging groove 49 comprises a flat bottom 50 along the axis of the first piston 22 and a pair of tapered side faces 51 and 52 which are inclined outwards away from each other on both sides of the bottom 50. The first rocker arm 7 is provided with a connection start controlling mechanism 53 for controlling when the first piston 22 is to be moved for connecting the rocker arms 7, 8 and 9, and a disconnection start controlling mechanism 54 for controlling when the first piston 22 is to be moved back for disconnecting the rocker arms 7, 8 and 9.

The connection start controlling mechanism 53 is disposed in a position corresponding to the engaging groove 49 when the first piston is in a retracted position in abutment with the stepped portion 31, as shown in FIG. 3a. It includes a cylinder portion 56 which extends in a direction perpendicular to the axis of the guide bore 26 and is integral with the first rocker arm 7 and whose open end is closed with a cap 55, a stopper pin 58 which is slidably fitted in the cylinder portion 56 to define an oil pressure chamber 57 between it and the cap 55 and which is engageable with the engaging groove 49, and a spring 59 which is disposed within the oil pressure chamber 57 and which urges the stopper pin 58 in the direction of engagement with the engaging groove 49.

The stopper pin 58 comprises a bottomed cylindrical portion 60 which is open facing the oil pressure chamber 57 and a pin portion 61 which is integral with the bottomed cylindrical portion 60. The pin portion 61 is slidably fitted in a slide-fitting hole 62 formed in the first rocker arm 7 between the cylinder portion 56 and the guide bore 26. In the cylinder portion 56, a space is formed on the side opposite to the oil pressure chamber 57 with respect to the bottomed cylindrical portion 60 of the stopper pin 58. This space is communicated with the exterior through an open hole 63 formed in the side wall of the cylinder portion 56 so that the movement of the stopper pin 58 is not impeded by fluid in that space.

As shown in FIG. 4, the first rocker arm 7 is formed with an oil passage 64 which communicates with the oil pressure chamber 57, while in the side wall of the rocker shaft 6 is formed a conduction hole 65 corresponding in location to the oil passage 64. The conduction hole 65 is provided to let the oil passage 64 communicate with the oil passage 29 in the rocker shaft 6 only when the first rocker arm 7 is pivoted away from the closed position of the intake valve V1. Thus, with connection start controlling mechanism 53, it is only possible to allow a venting or reduction in volume of the oil pressure chamber 57, namely, disengagement of the stopper pin 58 from the engaging groove 49, when the oil pressure chamber 57 is in communication with the oil passage 29 in the rocker shaft 6 by reason of pivoting of the rocker arm 7.

Figure 3C:
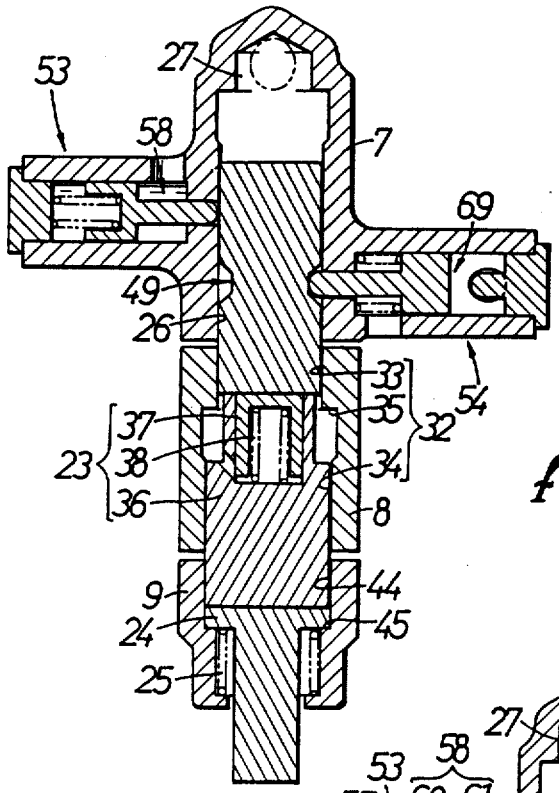
Figure 3D:
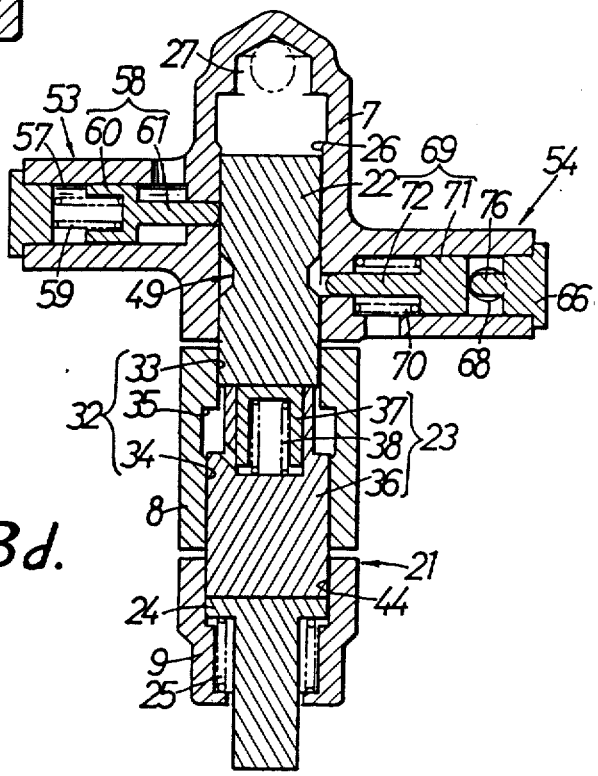

The disconnection start controlling mechanism 54 is disposed in a position corresponding to the engaging groove 49 when the first and second rocker arms 7 and 8 are in a completely connected state in which the first piston 22 is slide-fitted in the small-diameter portion 33 of the guide bore 32, as shown in FIG. 3c. It has a cylinder portion 67 which extends in a direction perpendicular to the axis of the guide bore 26 and is integral with the first rocker arm 7 and whose open end is closed with a cap 66, a stopper pin 69 which is slidably fitted in the cylinder portion 67 to define an oil pressure chamber 68 between it and the cap 66 and which is engageable with the engaging groove 49, and a spring 70 which urges the stopper pin 69 in a direction of the disengagement from the engaging groove 49.

The stopper pin 69 comprises a disc portion 71 which is slidably fitted in the cylinder portion 67 and a pin portion 72 which is integral with the disc portion 71. The pin portion 72 is slidably fitted in a slide-fitting hole 73 which is formed in the first rocker arm 7 between the cylinder portion 67 and the guide bore 26. In the cylinder portion 67, a spring chamber 74 is formed on the side opposite to the oil pressure chamber 68 with respect to the disc portion 71 of the stopper pin 69, and the spring 70 is disposed within the spring chamber 74. Further, in a side part of the cylinder portion 67 is formed an open hole 75 for communicating the spring chamber 74 with the exterior so that the movement of the stopper pin 69 is not impeded by fluid in the spring chamber 74. Projecting from the cap 66 is a stopper 76 for abutting the stopper pin 69 to limit the rearward movement of the latter. The length of the stopper 76 is designed so that the pin portion 72 is prevented from becoming disengaged from the slide-fitting hole 73.

As shown in FIG. 4, the first rocker arm 7 is formed with an oil passage 77 which communicates with the oil pressure chamber 68, while in the side wall of the rocker shaft 6 is formed a conduction hole 78 corresponding in location to the oil passage 77. The conduction hole 78 is formed to let the oil passage 77 communicate with the oil passage 29 in the rocker shaft 6 only when the first rocker arm 7 is pivoting to open or close the intake valve V1. Thus, with the disconnection start controlling mechanism 54, it is impossible to allow a venting or reduction in volume of the oil pressure chamber 68, namely disengagement of the stopper pin 69 from the engaging groove 49, when the oil pressure chamber 68 is out of communication with the oil passage 29 in the rocker shaft 6 by reason of the rocker arm 7 being in the "valve closed" position.

High pressure oil is supplied to the oil passage 29 in the rocker shaft 6 when the connecting means 21 is to be operated for connection of the rocker arms 7, 8 and 9. On the other hand, when the connecting means 21 is to be operated to disconnect the rocker arms or when the disconnected state is to be maintained, low pressure oil is exerted on the first piston 22. This low oil pressure is at a level that the first piston 22 will not start moving against the biasing force of the spring 38. By maintaining the oil passage 29 under oil pressure at all times rather than allowing the pressure to drop to zero, it is possible to prevent air from entering the oil pressure chambers 27, 57 and 68 during engine operation.

Operation of this embodiment of the invention will now be explained. While the engine operates at low speed, low pressure oil is supplied to the oil passage 29 and the oil pressure in the oil pressure chamber 27 is also low. Consequently, as shown in FIG. 3a, the connecting member 36 of the second piston 23 is kept in abutment with the stepped portion 35 by the biasing force of the spring 25 acting on the third portion 24, while the first piston 22 is kept in abutment with the stepped portion 31 by the extending member 37 which is biased by the spring 38. In this state, the mating surface of the connecting member 36 of the second piston 23 and on the third piston 24 is positioned between opposed side faces of the second and third rocker arms 8 and 9, and the second and third rocker arms 8 and 9 can undergo relative angular displacements while allowing the connecting member 36 and the third piston 24 to slide in contact with each other. The extending member 37 of the second piston 23 extends into the guide bore 26 of the first rocker arm 7, but the magnitude of the off-center relative movement between the guide bore 26 in the first rocker arm 7 which is pivoted by the low speed cam 3 and the extending member 37 in the second rocker arm 8 which is pivoted by the high speed cam 5, is relatively small. Therefore, the first and second rocker arms 7 and 8 can displace angularly relative to each other with the extending member 37 held in sliding contact with the end face of the first piston 22 in the guide bore 26 without the extending member 37 engaging the wall of the guide bore 26.

In such disconnected state of the connecting means 21, the first and second rocker arms 7 and 8 are pivoted by the low and high speed cams 3 and 5, respectively, while the third rocker arm 9 remains stationary. Consequently, only one intake valve V1 is operated and the other intake valve V2 remains closed. In this way, during a low speed operation of the engine, only one intake valve V1 is operated whereby there is a reduction in fuel consumption and an improvement in idling characteristics.

During disconnection state of the connecting means 21, the stopper pin 58 is engaged with the engaging groove 49 by the biasing force of the spring 59 in the connection start controlling mechanism 53, while in the disconnection start controlling mechanism 54 the stopper pin 69 is kept away from the first piston 22 by the biasing force of the spring 70.

During high speed operation of the engine, high pressure oil is supplied to the oil pressure chamber 27 of the connecting means, so that the first piston 22 tries to move toward the second rocker arm 8 against the biasing force of the spring 38. In this case, the stopper pin 58 in the connection start controlling mechanism 53 is in engagement with the engaging groove 49, and the side face 51 of the engaging groove 49 abuts the stopper pin 58 according to the movement of the first piston 22 as shown in FIG. 5 and pushes the stopper pin 58 toward the oil pressure chamber 57. However, in the connection start controlling mechanism 53, the oil pressure chamber 57 is communicated with the oil passage 29 only when the first rocker arm 7 is rocking to open one intake valve V1, and during other portions of the cycle the oil pressure chamber 57 is kept out of communication with the oil passage 29 whereby it is impossible to vent the oil from the oil pressure chamber 57, thus preventing movement of the stopper pin 58 toward the oil pressure chamber 57 and hence preventing movement of the first piston 22 toward the second rocker arm 8. When the first rocker arm 7 is in rocking motion, high oil pressure acts on the oil pressure chamber 57, but since the pressure receiving area of the stopper pin 58 is smaller than that of the first piston 22, the stopper pin 58 is pushed by the side face 51 of the engaging groove 49 and moves toward the oil pressure chamber 57, whereby the stopper pin 58 is disengaged from the engaging groove 49 to permit the movement of the first piston 22.

In this way, when the first rocker arm 7 is under rocking motion, the first piston 22 moves toward the second rocker arm 8 while compressing the spring 38, then comes into abutment with the cylindrical portion 39 of the second piston 23 as shown in FIG. 3b and pushes the connecting member 36 toward the third rocker arm 9. At this time, however, since the second rocker arm 8 is also under rocking motion by the action of the high speed cam 5, the guide bore 32 and the guide bore 44 in the third rocker arm 9 are out of alignment. Consequently, the movement of the connecting member 36 is prevented by the side face of the third rocker arm 9 on the side facing the second rocker arm 8.

When the first and second rocker arms 7 and 8 become stationary and the guide bores 26, 32 and 44 are aligned as shown in FIG. 3c, it becomes possible for the connecting member 36 to slide into the guide bore 44 of the third rocker arm 9. The first piston 22 slides into the small-diameter portion 33 of the guide bore 32 in the second rocker arm 8, while the connecting member 36 slides into the guide bore 44 of the third rocker arm 9 while compressing the spring 25. Upon abutment of the third piston 24 with the stepped portion 45, the movement of the first, second and third pistons 22, 23 and 24 stops and the first, second and third rocker arms 7, 8 and 9 are connected completely.

In such connected state by the connecting means 21, the first and third rocker arms 7 and 9 pivot together with the second rocker arm 8 which is driven by the high speed cam 5, and the intake valves V1 and V2 both operate. Consequently, both intake valves V1 and V2 are quickened in their opening timing and delayed in their closing timing, and these valve operations are performed at an increased amount of lift. In this way, the engine output in the high speed region is improved.

In the connected state of the rocker arms 7, 8 and 9 by the connecting means 21, the engaging groove 49 of the first piston 22 is in a position corresponding to the disconnection start controlling mechanism 54. Therefore, when the oil pressure in the oil pressure chamber 68 is high, that is, when the first rocker arm 7 is under rocking motion, the stopper pin 69 moves toward the first piston 22 against the biasing force of the spring 70 and comes into engagement with the engaging groove 49, as shown in FIG. 3c.

Assuming that the oil pressure in the oil passage 29 is lowered for disconnecting the rocker arms 7, 8 and 9, with the drop in oil pressure of the oil passage 29, the internal pressure of the oil pressure chamber 27 in the connecting means 21 decreases, so that the pistons 22, 23 and 24 are free to move toward their disconnected positions under the action of the spring 25. However, while the first rocker arm 7 is stationary, that is, when the intake valve V1 is closed, the oil pressure chamber 68 in the disconnection start controlling mechanism 54 is out of communication with the oil passage 29, so the side face 52 of the engaging groove 49 abuts the stopper pin 69 in the initial movement of the first piston 22 as shown in FIG. 6 and therefore, the movement of the stopper pin 69 is prevented. Thus, the first to third pistons 22, 23 and 24 are prevented from moving and remain connected. However, when the first rocker arm 7 is under rocking motion, the oil pressure in the oil pressure chamber 68 can be discharged to the oil passage 29, and the stopper pin 69 is disengaged from the engaging groove 49. As a result, the first piston 22 becomes movable. However, during rocking motion of the first rocker arm 7, that is, when the second rocker arm 8 is being pivoted by the high speed cam 5, the connecting member 36 of the second piston 23 is under the action of a frictional force induced between it and the guide bore 44, and the first piston 22 is also under the action of a frictional force induced between it and the small-diameter portion 33 of the guide bore 32, whereby any movement of the pistons 22, 23 and 24 is restricted. Then, when the rocker arms 7, 8 and 9 come into a stationary state, that is, when the guide bores 26, 32 and 44 are aligned, the pistons 22, 23 and 24 start moving and assume a state in which the mating surfaces of the first and second pistons 22 and 23 are positioned between the opposed side faces of the first and second rocker arms 7 and 8 and the mating surfaces of the second and third pistons 23 and 24 are positioned between the opposed side faces of the second and third rocker arms 8 and 9, as shown in FIG. 3e. Thereafter, the first piston 22 and the extending member 37 are urged by the spring 38 to move even further to revert to the state of FIG. 3a.

Figure 7:
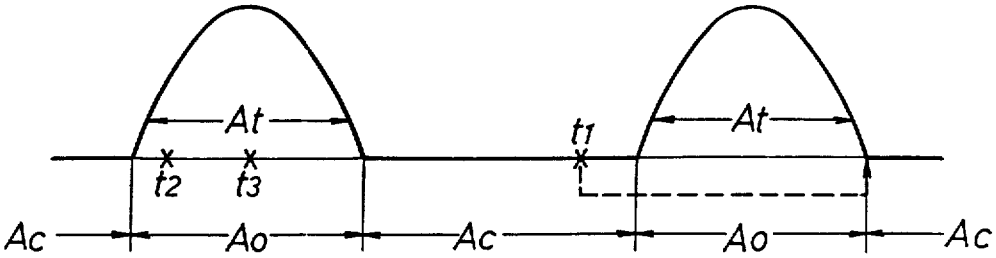
FIG. 7 is a graph of the valve opening and closing cycle with the valve position related to time.

Such operations of the connecting means 21 will now be explained by also referring to FIG. 7. The duration of time when the stopper pin 58 in the connection start controlling mechanism 53 can be disengaged from the engaging groove 49 in a disconnected state of the rocker arms 7, 8 and 9 and when the stopper pin 69 in the disconnection start controlling mechanism 54 can be disengaged from the engaging groove 49 in a connected state of the rocker arms 7, 8 and 9, is a time period corresponding to the section At which is slightly shorter than the valve opening section Ao in which the first rocker arm 7 is pivoting to operate one intake valve V1. Therefore, when the oil pressure supplied to the oil pressure chamber 27 is changed over between high and low at time points t2 and t3 in the section At, the connection and disconnection of the rocker arms 7, 8 and 9 by the connecting means 21 are effected positively in the next valve closed section Ac, that is, in a stationary state of the first rocker arm 7. When the oil pressure supplied to the oil pressure chamber 27 is changed over between high and low at a time point t1 in the valve closed section Ac, the change-over operation by the connecting means 21 is effected positively in the next valve closed section Ac beyond one section At as shown by a broken line in FIG. 7.

Although the components and operation of the intake valves V1 and V2 have been explained above, normally a pair of exhaust valves are also operated in the same way as those intake valves for each cylinder of the engine, although the mechanism may be used on only the intake valves or only the exhaust valves, if so desired. Further, the mechanism may be used for operating only a single valve in two different manners for low and high speed.

What is claimed:

1. A valve operating mechanism for an internal combustion engine having a pair of intake or exhaust valves for each engine cylinder, comprising, a camshaft having high speed and low speed cams thereon, a rocker arm shaft having first, second and third rocker arms pivotally mounted thereon in mutually adjacent relationship, said first and third rocker arms engaging said pair of valves, said first and second rocker arms engaging said low speed and high speed cams, respectively, and piston means in said rocker arms selectively shiftable between positions connecting said rocker arms for pivotal movement in unison and disconnecting said rocker arms for independent movement.

2. The valve operating mechanism of claim 1 wherein said piston means includes two pistons slidably mounted in two of said rocker arms for sliding movement parallel to said rocker shaft, and said two pistons selectively moveable between a position extending between and connecting said first and second rocker arms and said second and third rocker arms to a position disconnecting said rocker arms.

3. The valve operating mechanism of claim 2 wherein a first of said two pistons is slidably mounted in said first rocker arm and slidable into said second rocker arm for connecting the first and second rocker arms.

4. The valve operating mechanism of claim 3 wherein a second of said two pistons is slidably mounted in said second rocker arm and slidable into said third rocker arm for connecting the second and third rocker arms.

5. The valve operating mechanism of claim 4 wherein said second piston includes an extendable member facing and in engagement with said first piston, and means for resiliently urging said extendable member toward said first piston.

6. The valve operating mechanism of claim 5 wherein said extendable member is of a size and shape for projecting into said first rocker arm without preventing relative movement of said first and second rocker arms as caused by said low speed and high speed cams.

7. The valve operating mechanism of claim 4 wherein said piston means includes a third piston slidably mounted in said third rocker arm, and means are provided in said third rocker arm for continually and resiliently urging said third piston into engagement with said second piston.

8. The valve operating mechanism of claim 3 wherein said first rocker arm is provided with a pressure chamber at an end of said first piston opposite from said second rocker arm, and means are provided for selectively applying oil pressure on said chamber to urge said first piston into said second rocker arm.

9. The valve operating mechanism of claim 8 wherein a second of said two piston means is slidably mounted in said second rocker arm and slidable into said third rocker by the first piston being moved into said second rocker arm by said oil pressure in the chamber for connecting said first, second and third rocker arms.

10. The valve operating mechanism of claim 1 wherein guide bores are provided in each rocker arm parallel to said rocker shaft and in axial alignment, and said piston means includes a separate piston slidably mounted in the guide bore of each rocker arm.

11. The valve operating mechanism of claim 10 wherein means are provided for shifting the piston in said first rocker arm partially into said second rocker arm to connect said first and second rocker arms and shifting the piston in the second rocker arm partially into said third rocker arm to connect said second and third rocker arms.

12. The valve operating mechanism of claim 11 wherein a pressure chamber is provided in said first rocker arm at an end of the piston therein opposite the second rocker arm, means for providing oil pressure to said chamber when said guide bores are aligned for causing said connecting movement of said pistons, and spring means in said third rocker arm for urging the three said pistons toward the chamber to return each of the pistons to a position within a rocker arm for disconnecting said rocker arms.

13. The valve operating mechanism of claim 2 wherein stop means are provided for engaging and preventing the movement of said pistons, and means for releasing said stop means for allowing the start of piston movement at a specific time in the cam rotation cycle.

14. The valve operating mechanism of claim 13 wherein said means for releasing said stop means include oil chamber means with means for venting oil therefrom to allow releasing of said stop means only during pivoting of said first rocker arm away from the valve closed positions.

15. The valve operating mechanism of claim 14 wherein said piston means are released for movement prior to a valve closed position of said rocker arms and movement of said piston means between connect and disconnect conditions occurs during the valve closed position.

16. A valve operating mechanism for an internal combustion engine having a pair of intake or exhaust valves for each engine cylinder, comprising, a camshaft having high speed and low speed cams thereon, a rocker arm shaft having first, second and third rocker arms pivotally mounted thereon in mutually adjacent relationship, said first and third rocker arms engaging said pair of valves, said first and second rocker arm engaging said low speed and high speed cams, respectively, piston means in said rocker arms selectively shifting between positions connecting said rocker arms for pivotal movement in unison and disconnecting said rocker arms for independent movement, stopper pin means for engaging and preventing said shifting of said piston means, and means for releasing said stopper pin means from said engagement with said piston means.

17. The valve operating mechanism of claim 16 wherein said piston means include two pistons slidably mounted in two of said rocker arms for sliding movement parallel to said rocker shaft, and said two pistons selectively moveable between a position extending between and connecting said first and second rocker arms and said second and third rocker arms to a position disconnecting said rocker arms.

18. The valve operating mechanism of claim 17 wherein said two pistons comprise first and second pistons mounted in said first and second rocker arms, respectively, said piston means includes a third piston slidably mounted in said third rocker arm, and means are provided in said third rocker arm for continually and resiliently urging said third piston into engagement with said second piston.

19. The valve operating mechanism of claim 18 wherein said first rocker arm is provided with a pressure chamber at an end of said first piston opposite from said second rocker arm, and means are provided for selectively applying oil pressure on said chamber to urge said first piston into said second rocker arm.

20. The valve operating mechanism of claim 19 wherein a second of said two piston means is slidably mounted in said second rocker arm and slidable into said third rocker by the first piston being moved into said second rocker arm by said oil pressure in the chamber for connecting said first, second and third rocker arms.

21. The valve operating mechanism of claim 16 wherein guide bores are provided in each rocker arm parallel to said rocker shaft and in axial alignment, and said piston means includes a separate piston slidably mounted in the guide bore of each rocker arm.

22. The valve operating mechanism of claim 21 wherein means are provided for shifting the piston in said first rocker arm partially into said second rocker arm to connect said first and second rocker arms and shifting the piston in the second rocker arm partially into said third rocker arm to connect said second and third rocker arms.

23. The valve operating mechanism of claim 22 wherein a pressure chamber is provided in said first rocker arm at an end of the piston therein opposite the second rocker arm, means for providing oil pressure to said chamber when said guide bores are aligned for causing said connecting movement of said pistons, and spring means in said third rocker arm for urging the three said pistons toward the chamber to return each of the pistons to a position within a rocker arm for disconnecting said rocker arms.

24. The valve operating mechanism of claim 16 wherein said means for releasing said stopper pin means include oil chamber means with means for venting oil therefrom to allow releasing of said stopper pin means only during pivoting of said first rocker arm away from the valve closed position.

25. The valve operating mechanism of claim 24 wherein said piston means are released for movement prior to a valve closed position of said rocker arms and movement of said piston means between connect and disconnect conditions occurs during the valve closed position.

26. A valve operating mechanism for an internal combustion engine having a pair of intake or exhaust valves for each engine cylinder, comprising, a camshaft having high speed and low speed cams thereon, a rocker arm shaft having first, second and third rocker arms mounted thereon in mutually adjacent relationship, said first and third rocker arms engaging said pair of valves, said first and second rocker arms engaging said low speed and high speed cams, respectively, piston means in said rocker arms selectively shiftable between positions connecting said rocker arms for pivotal movement in unison and disconnecting said rocker arms for independent movement, stopper pin means for engaging and preventing said shifting of said piston means, means for releasing said stopper pin means from said engagement with said piston means only during a rocking movement of said first rocker arm, and means for causing said selective shiftable movement of said piston means only while said rocker arms are not rocking.

27. The valve operating mechanism of claim 26 wherein said piston means include two pistons slidably mounted in two of said rocker arms for sliding movement parallel to said rocker shaft, and said two pistons selectively moveable between a position extending between and connecting said first and second rocker arms and said second and third rocker arms to a position disconnecting said rocker arms.

28. A valve operating mechanism for a pair of valves in an internal combustion engine, including cams integral with a rotating cam shaft, rocker arms for opening the pair of valves in accordance with rotating motion of said cams, said rocker arms being pivotably supported by a rocker shaft, and a mechanism for interrupting the operation of one of said paired valves according to an operational condition of the engine, comprising, a low speed cam corresponding to one valve and having a shape corresponding to a low speed operation of the engine, a high speed cam of a shape corresponding to a high speed operation of the engine, a first rocker arm adjacent to said low speed cam and capable of abutting one valve, a second rocker arm in sliding contact with said high speed cam, and a third rocker arm abutting the other valve, said rocker arms pivotably supported by said rocker shaft adjacent to each other in a manner to permit relative angular displacement therebetween, a first piston for selectively connecting between the first and second rocker arms being movably mounted in the first rocker arm and having an oil pressure chamber facing the side opposite to the second rocker arm, a second piston movably mounted in the second rocker arm for selectively connecting between the second and third rocker arms and having means for extending and contracting toward the first piston while exerting a spring force in an extending direction, one end of the second piston being in abutment with the other end of the first piston, a third piston movably mounted in the third rocker arm, the third piston being urged by a spring in a direction of abutment with the other end of the second piston, all three said pistons being aligned when the three rocker arms are in the valve closed position, an annular groove in said first piston, and means in said first rocker arm for controlling the start of the connection movement of said three pistons including a pin for engaging said groove and being disengageable only during pivoting of said first rocker arm.

*29. A valve operating mechanism for an internal combustion engine having at least one intake valve or exhaust valve for a cylinder, comprising, a camshaft having at least two cams of different profiles thereon for the cylinder, a rocker arm shaft having at least a pair of rocker arms pivotally mounted thereon in adjacent relationship, at least one of said rocker arms engaging the valve for that cylinder, each of said pair of rocker arms engaging a respective one of said cams, and piston means operably associated with said rocker arms selectively shiftable by oil pressure between a position connecting said at least a pair of rocker arms for pivotal movement in unison and a position disconnecting said at least a pair of rocker arms for independent movement, a high speed cam engaging one rocker arm of said at least a pair of rocker arms for operating said valve in a high speed mode when said at least a pair of rocker arms are connected for movement in unison, and a low speed cam engaging the other rocker arm of said at least a pair of rocker arms which said other rocker arm engages said valve for operating said valve in a low speed mode when said at least a pair of rocker arms are disconnected for independent movement.*

*30. The valve operating mechanism of claim 29, wherein there are two said intake or exhaust valves and three said rocker arms with each said valve engaged by a separate rocker arm.*

*31. The valve operating mechanism of claim 30, wherein one of the intake or exhaust valves remains closed when said at least a pair of rocker arms are disconnected.*

*32. The valve operating mechanism of claim 30, wherein said rocker arm that is not engaging said valve has means for engaging said cam with a high speed profile, and said piston means selectively connects all three rocker arms for said pivotal movement in unison to operate said two intake or exhaust valves in a high speed mode.*

*33. The valve operating mechanism of claim 32, wherein the two valves are symmetrically located relative to said rocker arm that does not engage a valve.*

*34. The valve operating mechanism of claim 25, wherein said rocker arm that does not engage a valve is positioned on said rocker shaft between the two rocker arms engaging the valves.*

* * * * *